(12) United States Patent
Gunda (10) Patent No.: US 8,595,243 B1
(45) Date of Patent: Nov. 26, 2013

(54) SYSTEMS AND METHODS FOR DEDUPLICATING ARCHIVED DATA

(75) Inventor: Laxmikant Gunda, Pune (IN)

(73) Assignee: Symantec Corporation, Mountain View, CA (US)

( * ) Notice: Subject to any disclaimer, the term of this patent is extended or adjusted under 35 U.S.C. 154(b) by 24 days.

(21) Appl. No.: 13/285,076

(22) Filed: Oct. 31, 2011

(51) Int. Cl.
G06F 17/30 (2006.01)
G06F 7/00 (2006.01)

(52) U.S. Cl.
USPC .......................................... 707/755; 707/758

(58) Field of Classification Search
USPC ................................................ 707/755, 758
See application file for complete search history.

(56) References Cited

U.S. PATENT DOCUMENTS

| | | | |
|---|---|---|---|
| 6,587,217 B1 * | 7/2003 | Lahey et al. | 358/1.15 |
| 8,078,583 B2 * | 12/2011 | Prahlad et al. | 707/651 |
| 8,407,186 B1 * | 3/2013 | Cremelie et al. | 707/664 |
| 2004/0093361 A1 * | 5/2004 | Therrien et al. | 707/204 |
| 2009/0094424 A1 * | 4/2009 | Bondurant et al. | 711/161 |
| 2011/0145196 A1 * | 6/2011 | Bender et al. | 707/640 |
| 2011/0282841 A1 * | 11/2011 | Saika et al. | 707/649 |
| 2012/0158670 A1 * | 6/2012 | Sharma et al. | 707/692 |
| 2012/0209814 A1 * | 8/2012 | Zhang et al. | 707/654 |

OTHER PUBLICATIONS

Laxmikant Gunda, Systems and Methods for Migrating Archived Files; U.S. Appl. No. 13/285,085, filed Oct. 31, 2011.

* cited by examiner

*Primary Examiner* — Kuen Lu
(74) *Attorney, Agent, or Firm* — ALG Intellectual Property, LLC (57) ABSTRACT

A computer-implemented method for deduplicating archived data may include (1) identifying a volume of data subject to deduplication, with the volume of data comprising at least one archived file that is represented on the volume of data with a placeholder file and is stored on an alternate volume of data, and (2) determining a disposition of the archived file for deduplication by (i) determining that the archived file is represented by the placeholder file, and, in response to determining that the archived file is represented by the placeholder file, (ii) identifying a deduplication fingerprint of the archived file instead of a deduplication fingerprint of the placeholder file. Various other methods, systems, and computer-readable media are also disclosed.

18 Claims, 6 Drawing Sheets

SYSTEMS AND METHODS FOR DEDUPLICATING ARCHIVED DATA

BACKGROUND

Data deduplication may reduce the amount of storage space used in a storage system by detecting and preventing redundant copies of data from being stored to the storage system. For example, if multiple instances of a file exist in a deduplicated file system, a deduplicated data system may store a single instance of the file and link all instances of the file to the single stored instance. If one of the instances of the file is later modified, the deduplicated data system may break the link between the modified instance and the single stored instance and store the modified instance of the file separately.

Data deduplication involves identifying redundant copies of the same data. Because of the processing requirements involved in comparing each incoming unit of data with each unit of data that is already stored in a single-instance data storage system, redundant copy identification is usually performed by generating and comparing smaller data signatures ("fingerprints") of each data unit instead of comparing the data units themselves. The detection of redundant copies generally involves generation of a new fingerprint for each unit of data to be stored to the single-instance data storage system and comparison of the new fingerprint to existing fingerprints of data units already stored by the single-instance data storage system. If the new fingerprint matches an existing fingerprint, a copy of the unit of data is likely already stored in the single-instance data storage system.

Unfortunately, traditional data deduplication techniques may perform poorly when some files within a deduplicated data system are archived. An archival system may archive a file by moving the file to an archival storage system and leave a placeholder file (e.g., a "stub" file) in the place of the archived file. When the archival system later identifies an attempt to access the archived file (i.e., the placeholder file), the archival system may retrieve the archived file from the archival storage system, overwriting the placeholder file. When the archival system replaces a deduplicated file with a placeholder file, a deduplication system may determine that the deduplicated file has changed, and the deduplicated file may lose its deduplication links. When the archival system subsequently retrieves the previously deduplicated file, the deduplication system may again detect a change and reprocess the previously deduplicated file (e.g., by generating a new fingerprint). Accordingly, the deduplication system may lose information about and perform redundant operations on archived files. Therefore, the instant disclosure identifies a need for additional and improved systems and methods for deduplicating archived data.

SUMMARY

As will be described in greater detail below, the instant disclosure generally relates to systems and methods for deduplicating archived data by maintaining awareness of archived files and treating placeholder files as the archived files to which they refer for deduplication purposes. In one example, performing such a task may include (1) identifying a volume of data subject to deduplication, with the volume of data including at least one archived file and the archived file being represented on the volume of data with a placeholder file and being stored on an alternate volume of data, and (2) determining a disposition of the archived file for deduplication by (i) determining that the archived file is represented by the placeholder file, and, in response to determining that the archived file is represented by the placeholder file, (ii) identifying a deduplication fingerprint of the archived file instead of a deduplication fingerprint of the placeholder file.

Determining the disposition of the archived file for deduplication may include any of a variety of steps. For example, determining the disposition of the archived file for deduplication may include, based on the deduplication fingerprint of the archived file, identifying at least one additional instance of the archived file and deduplicating the archived file with the additional instance of the archived file. Additionally or alternatively, determining the disposition of the archived file may include, based on the deduplication fingerprint of the archived file, identifying at least one additional instance of the archived file and maintaining a reference identifying the archived file as deduplicated with the additional instance of the archived file. In some examples, determining the disposition of the archived file for deduplication may also include intercepting an attempt by a deduplication engine to access the placeholder file and providing the deduplication fingerprint of the archived file to the deduplication engine. Additionally or alternatively, determining the disposition of the archived file for deduplication may include determining that the archived file is being restored in place of the placeholder file and transmitting a message to a deduplication engine that the archived file is unchanged.

In one example, identifying the deduplication fingerprint of the archived file may include retrieving the archived file and generating the deduplication fingerprint of the archived file. In this example, the computer-implemented method may also include modifying the placeholder file to include the generated deduplication fingerprint. In some examples, identifying the deduplication fingerprint of the archived file may include reading the deduplication fingerprint of the archived file from the placeholder file.

In one embodiment, a system for implementing the above-described method may include an identification module programmed to identify a volume of data subject to deduplication, with the volume of data including at least one archived file and the archived file being represented on the volume of data with a placeholder file and being stored on an alternate volume of data. The system may also include a disposition module programmed to determine a disposition of the archived file for deduplication by (1) determining that the archived file is represented by the placeholder file, and, in response to determining that the archived file is represented by the placeholder file, (2) identifying a deduplication fingerprint of the archived file instead of a deduplication fingerprint of the placeholder file. The system may additionally include at least one processor configured to execute the identification module and the disposition module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a volume of data subject to deduplication, with the volume of data including at least one archived file and the archived file being represented on the volume of data with a placeholder file and being stored on an alternate volume of data, and (2) determine a disposition of the archived file for deduplication by (i) determining that the archived file is represented by the placeholder file, and, in response to determining that the archived file is represented by the placeholder file, (ii) identifying a deduplication fingerprint of the archived file instead of a deduplication fingerprint of the placeholder file.

As will be explained in greater detail below, by maintaining awareness of archived files and treating placeholder files as the archived files to which they refer for deduplication purposes, the systems and methods described herein may improve the efficiency of deduplication by preventing redundant processing of deduplicated files when deduplicated files are moved to and/or retrieved from archives. These systems and methods may thereby reduce the computing resources dedicated to deduplication and/or archiving and potentially leave more computing resources for use by primary applications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
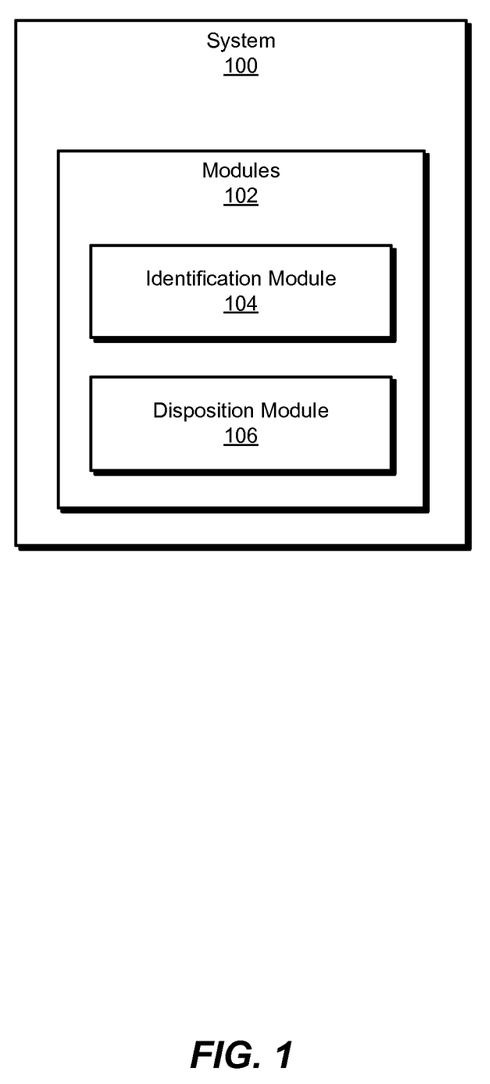
FIG. 1 is a block diagram of an exemplary system for deduplicating archived data.
Figure 2:
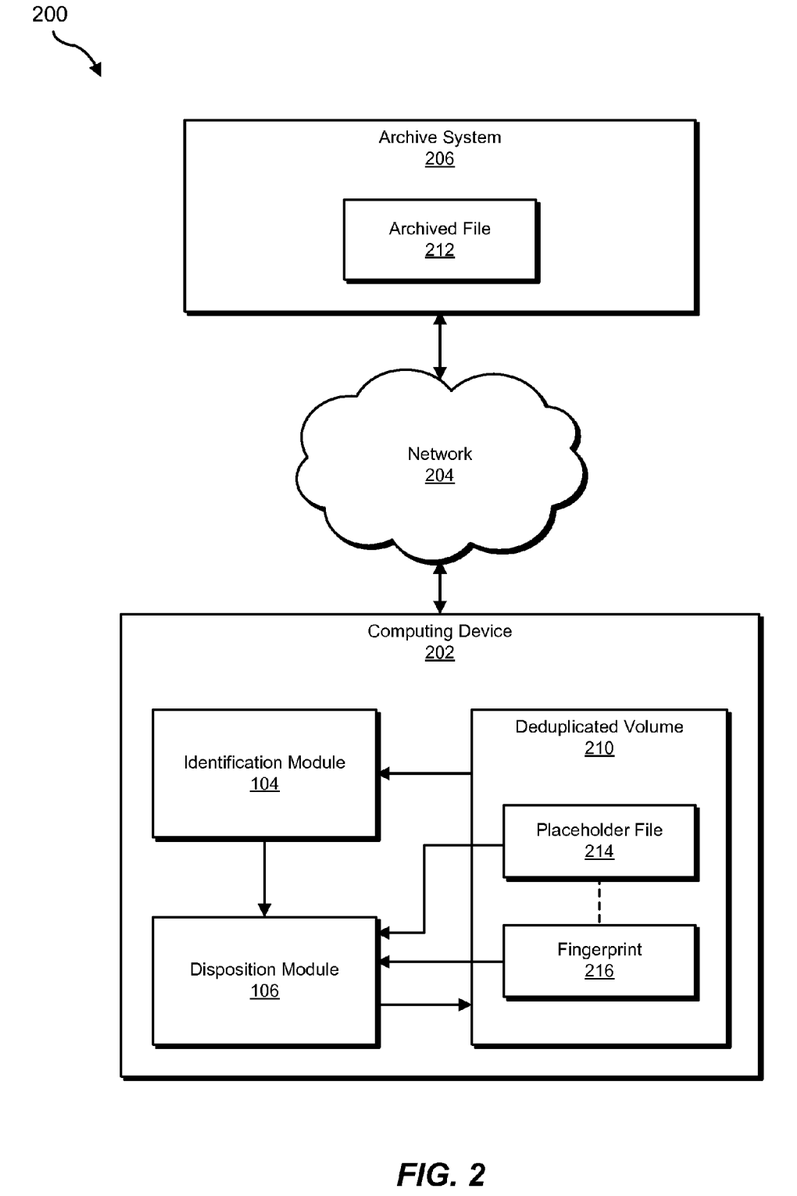
FIG. 2 is a block diagram of an exemplary system for deduplicating archived data.
Figure 3:
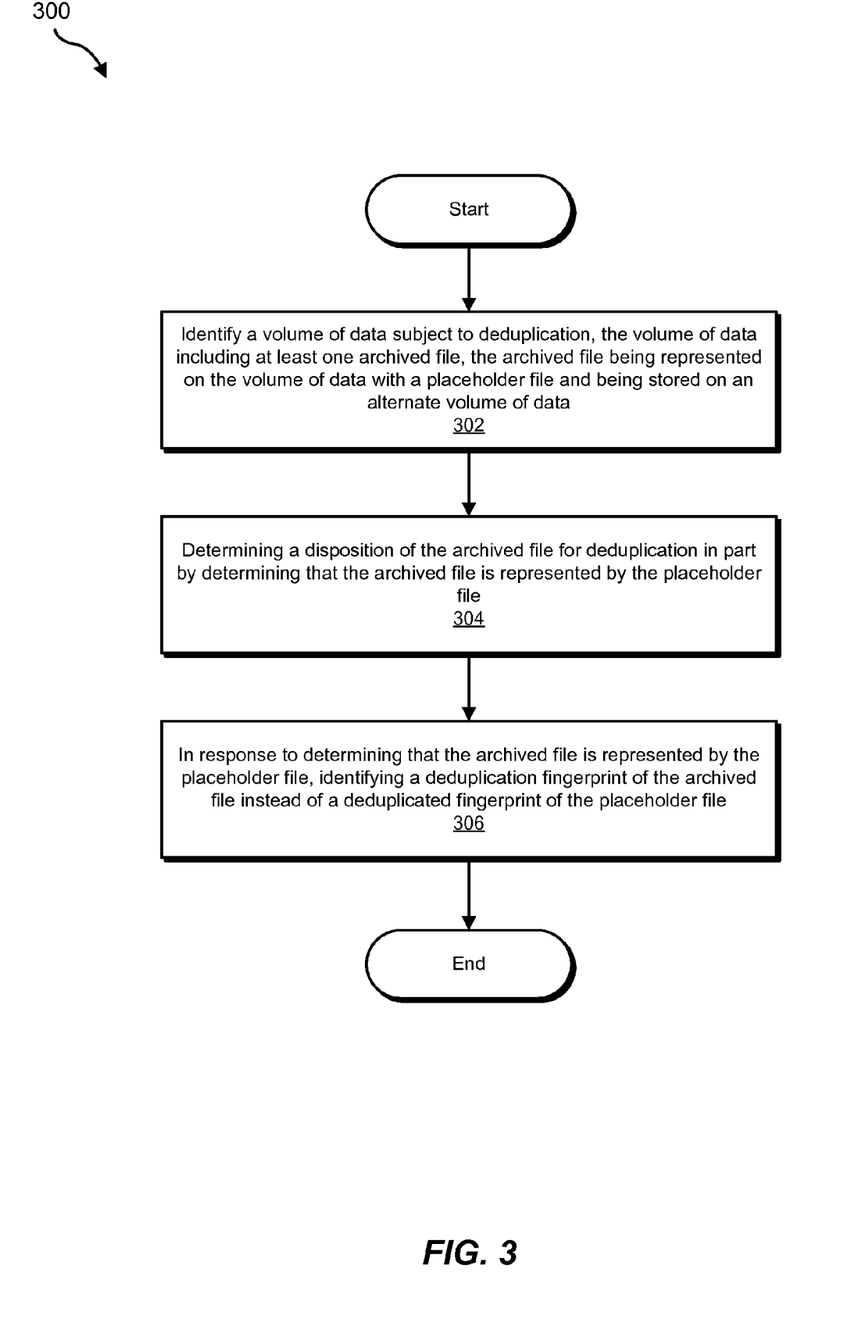
FIG. 3 is a flow diagram of an exemplary method for deduplicating archived data.
Figure 4:
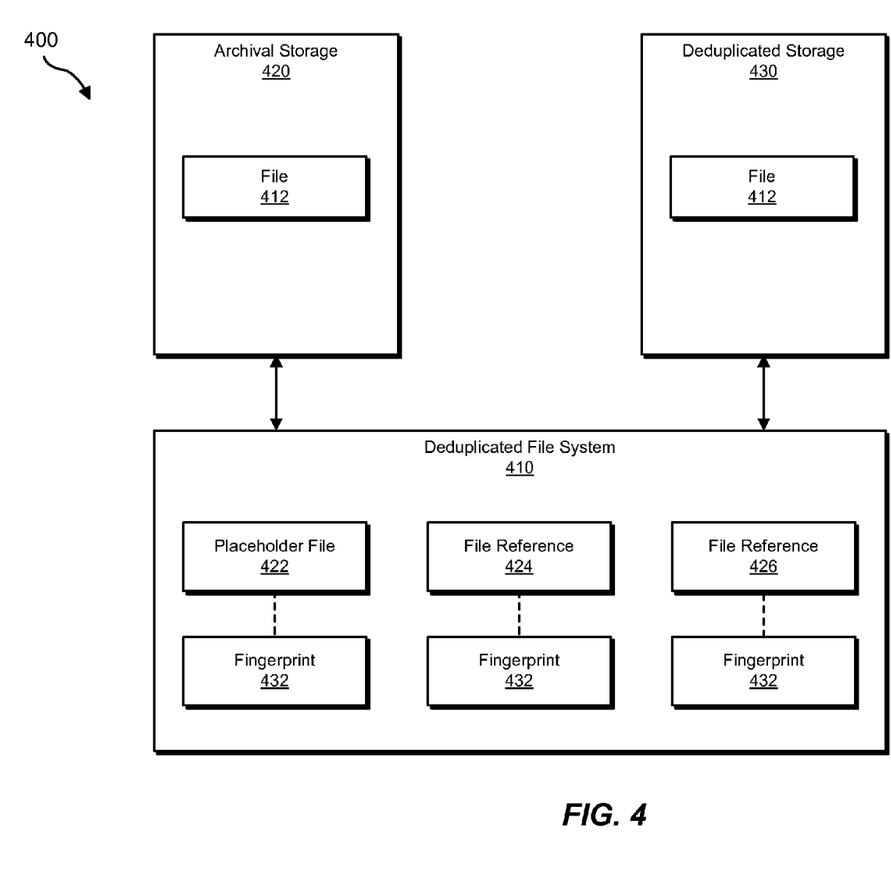
FIG. 4 is a block diagram of an exemplary system for deduplicating archived data.

The following will provide, with reference to FIGS. 1, 2, and 4, detailed descriptions of exemplary systems for deduplicating archived data. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for deduplicating archived data. As illustrated in this figure, exemplary system 100 may include one or more modules 102 for performing one or more tasks. For example, and as will be explained in greater detail below, exemplary system 100 may include an identification module 104 programmed to identify a volume of data subject to deduplication. As will be explained below, this volume of data may include at least one archived file that is represented on the volume of data with a placeholder file and stored on an alternate volume of data.

In addition, and as will be described in greater detail below, exemplary system 100 may include a disposition module 106 programmed to determine a disposition of the archived file for deduplication by (i) determining that the archived file is represented by the placeholder file, and, in response to determining that the archived file is represented by the placeholder file, (ii) identifying a deduplication fingerprint of the archived file instead of a deduplication fingerprint of the placeholder file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or archive system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an archive system 206 via a network 204.

In one embodiment, one or more of modules 102 from FIG. 1 may, when executed by at least one processor of computing device 202, facilitate computing device 202 in deduplicating archived data. For example, and as will be described in greater detail below, one or more of modules 102 may cause computing device 202 to (1) identify a volume of data subject to deduplication (e.g., a deduplicated volume 210), the volume of data including at least one archived file (e.g., an archived file 212) that is represented on the volume of data with a placeholder file (e.g., a placeholder file 214) and stored on an alternate volume of data (e.g., an archive system 206), and (2) determine a disposition of the archived file for deduplication by (i) determining that the archived file is represented by the placeholder file (e.g., determining that archived file 212 is represented by placeholder file 214), and, in response to determining that the archived file is represented by the placeholder file, (ii) identifying a deduplication fingerprint of the archived file (e.g., a fingerprint 216) instead of a deduplication fingerprint of the placeholder file.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Archive system 206 generally represents any type or form of computing device that is capable of receiving, handling, processing, storing, and/or retrieving archived files.

Examples of archive system 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and archive system 206.

FIG. 3 is a flow diagram of an exemplary computer-implemented method 300 for deduplicating archived data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a volume of data subject to deduplication. As will be explained below, this volume of data may include at least one archived file that is represented on the volume of data with a placeholder file and stored on an alternate volume of data. For example, at step 302 identification module 104 may, as part of computing device 202 in FIG. 2, identify deduplicated volume 210 including archived file 212, which may be represented on deduplicated volume 210 with placeholder file 214 and may be stored on archive system 206.

As used herein, the phrase "volume of data" may refer to any distinctly identifiable collection of data. Examples of a volume of data include, without limitation, a file system partition, a logical volume, and/or a selected group of files.

In addition, the term "deduplication," as used herein, may refer to one or more operations related to reducing the amount of storage space used in a data storage system, including operations for detecting and preventing data from being redundantly stored to the same storage system. For example, data deduplication may reduce the amount of storage space used in a data storage system by detecting and removing redundant copies of data in the data storage system (and, e.g., replacing the redundant copies with references to a single copy). In some examples, the term "deduplication" may refer to file-level deduplication. In one example, as will be described in greater detail below, "deduplication" may refer to block-level deduplication.

The term "archiving," as used herein, generally refers to any type of data transfer (or data storage) technique that involves migrating data (e.g., a file) from at least one computing (or storage) device to at least one additional computing (or storage) device and replacing the migrated data with a placeholder (e.g., a reference, a stub, etc.). Accordingly, the phrase "placeholder file" as used herein may refer to any type of file and/or analogous data object left in place of migrated data. In some examples, the placeholder file may be smaller than the archived file it replaced. Additionally or alternatively, the size of the placeholder file may fall below a predetermined threshold (e.g., one kilobyte). In some examples, the placeholder file may use the same identifier as the archived file it replaced (e.g., the same file name). In some additional examples, the placeholder file may contain information relating to the location of the archived file in an archive system (e.g., the alternate volume of data).

The alternate volume of data may include any suitable volume of data. In some examples, the alternate volume of data may reside on a different storage device than the volume of data. In one example, the alternate volume of data may reside within an archive storage system. The archive storage system may include one or more storage devices providing storage at a lower cost, higher reliability, and/or lower performance than a storage device that stores the placeholder file.

Identification module 104 may identify the volume of data in any of a variety of contexts. For example, identification module 104 may identify the volume of data by operating as a part of a deduplication system configured to deduplicate the volume of data. Additionally or alternatively, identification module 104 may identify the volume of data by operating as a part of an archive system configured to handle file archiving (e.g., migrating files, creating placeholder files, and/or retrieving archived files when needed) for the volume of data. In some examples, identification module 104 may identify the volume of data by reading from a configuration file and/or receiving a message identifying the volume of data as a volume subject to both deduplication and archiving.

FIG. 4 illustrates an exemplary system 400 for deduplicating archived files. As shown in FIG. 4, system 400 may include a deduplicated file system 410 for storing both archived data in an archival storage 420 and deduplicated data in a deduplicated storage 430. Using FIG. 4 as an example, at step 302 identification module 104 may identify deduplicated file system 410 including a file 412 represented by a placeholder file 422 and stored on archival storage 420.

Returning to FIG. 3, at step 304 one or more of the systems described herein may determine a disposition of the archived file for deduplication in part by determining that the archived file is represented by the placeholder file. For example, at step 304 disposition module 106 may, as part of computing device 202 in FIG. 2, determine a disposition of archived file 212 for deduplication in part by determining that archived file 212 is represented by placeholder file 214.

As will be explained in greater detail below, disposition module 106 may determine the disposition of the archived file by determining any of a variety of possible actions to take with respect to the archived file. For example, disposition module 106 may determine the disposition of the archived file by determining whether or not to deduplicate the archived file, by determining how to link the archived file with other deduplicated files, by determining what deduplication fingerprint applies to the placeholder file of the archived file, and/or by determining any other aspect of deduplication relating to the archived file represented by the placeholder file.

Disposition module 106 may determine that the archived file is represented by the placeholder file in any of a variety of ways. For example, disposition module 106 may determine that the archived file is represented by the placeholder file by querying an archive system. Additionally or alternatively, disposition module 106 may determine that the archived file is represented by the placeholder file by determining that the placeholder file is a placeholder file based on one or more characteristics of the placeholder file. For example, disposition module 106 may examine the size of the placeholder file, the contents of the placeholder file, and/or other metadata of the placeholder file to determine that the placeholder file represents an archived file. In some examples, disposition module 106 may receive a message that the archived file is represented by the placeholder file. Additionally or alternatively, disposition module 106 may operate as a part of an archive system and determine that the archived file is represented by the placeholder file as a part of the archive system.

Returning to FIG. 3, at step 306 one or more of the systems described herein may determine a disposition of the archived file for deduplication at least in part by, and in response to determining that the archived file is represented by the placeholder file, identifying a deduplication fingerprint of the archived file instead of a deduplication fingerprint of the placeholder file. For example, at step 306 disposition module 106 may, as part of computing device 202 in FIG. 2, determine the disposition of archived file 212 for deduplication at least in part by identifying fingerprint 216 of archived file 212 instead of a deduplication fingerprint of placeholder file 214.

As used herein, the term "fingerprint" may refer to any type of fingerprint, hash function output, checksum, and/or digital signature that corresponds to and/or uniquely identifies a data object and any copies of the data object. In some examples, a fingerprint may be smaller than the data object that it identifies.

Disposition module 106 may identify the deduplication fingerprint of the archived file in any of a variety of ways. For example, disposition module 106 may identify the deduplication fingerprint of the archived file by retrieving the archived file and generating the deduplication fingerprint of the archived file. For example, disposition module 106 may request an archive system to provide the archived file in a pass-through mode (e.g., without restoring the archived file). Disposition module 106 may then generate the deduplication fingerprint based on the data received in the pass-through mode. In some examples, disposition module 106 may also preserve the generated deduplication fingerprint for later use. For example, disposition module 106 may modify the placeholder file to include the generated deduplication fingerprint. Additionally or alternatively, disposition module 106 may associate the deduplication fingerprint of the archived file with the placeholder file by adding the deduplication fingerprint to a metadata store of the placeholder file and/or by associating the deduplication fingerprint with the placeholder file in a separate data structure. Accordingly, in some examples, disposition module 106 may identify the deduplication fingerprint of the archived file by reading the deduplication fingerprint of the archived file from the placeholder file, or by reading the deduplication fingerprint from a metadata store of the placeholder file or a data structure associating the placeholder file with the deduplication fingerprint.

Using FIG. 4 as an example, in order to determine the disposition of placeholder file 422 for deduplication, disposition module 106 may identify a fingerprint 432 of file 412. For example, disposition module 106 may read file 412 from archival storage 420 in a pass-through mode and generate fingerprint 432. Disposition module 106 may then store fingerprint 432 in placeholder file 422 and/or associate fingerprint 432 with placeholder file 422. In some examples, disposition module 106 may identify fingerprint 432 as pertaining to the file referenced by placeholder file 422 by reading fingerprint 432 from placeholder file 422.

As mentioned earlier, disposition module 106 may determine the disposition of the archived file for deduplication in any of a variety of ways. For example, disposition module 106 may, based on the deduplication fingerprint of the archived file, identify at least one additional instance of the archived file. Disposition module 106 may then deduplicate the archived file with the additional instance of the archived file. Using FIG. 4 as an example, a file reference 424 and a file reference 426 within deduplicated file system 410 may each reference file 412 within deduplicated storage 430. Accordingly, file references 424 and 426 may each have fingerprint 432 corresponding to file 412. In this example, disposition module 106 may deduplicate file 412 represented by placeholder file 422 with file references 424 and 426.

In another example, disposition module 106 may determine the disposition of the archived file for deduplication by, based on the deduplication fingerprint of the archived file, identifying at least one additional instance of the archived file and maintaining a reference identifying the archived file as deduplicated with the additional instance of the archived file. For example, a deduplication system may maintain information linking multiple instances of a file to a single stored instance of the file. In this example, disposition module 106 may determine that the reference identifying the archived file as deduplicated with the additional instance of the archived file is correct, despite the placeholder file not being identical to the additional instance of the archived file. Using FIG. 4 as an example, a file reference 424 and a file reference 426 within deduplicated file system 410 may each reference file 412 within deduplicated storage 430. Accordingly, file references 424 and 426 may each have fingerprint 432 corresponding to file 412. In this example, disposition module 106 may maintain a reference identifying file 412 on archive system 420, as it is represented by placeholder file 422, as deduplicated with file references 424 and 426 and, therefore, representing file 412 on deduplicated storage 430.

In some examples, disposition module 106 may also undertake the disposition of the archived file as it was previously determined. For example, disposition module 106 may intercept an attempt by a deduplication engine to access the placeholder file and provide the deduplication fingerprint of the archived file to the deduplication engine. In this example, the deduplication engine may then treat the placeholder file as the archived file for deduplication purposes. For example, the deduplication engine may decline to generate a deduplication fingerprint based on the contents of the placeholder file having been provided the deduplication fingerprint based on the archived file. Additionally or alternatively, the deduplication engine may maintain deduplication links between the archived file (e.g., via the placeholder file) and other instances of the archived file stored within a deduplication system.

In some examples, disposition module 106 may affect the disposition of the archived file for deduplication in the midst of a change to the archival status of the archived file. For example, disposition module 106 may determine that the archived file is being restored in place of the placeholder file (e.g., because an application attempted to read from the placeholder file, triggering a retrieval of the archived file by an archive system). Disposition module 106 may then transmit a message to a deduplication engine that the archived file is unchanged. The deduplication engine may thereby avoid reprocessing the archived file even though an apparent change to the placeholder file occurred.

As mentioned earlier, in one example the deduplication may consist of block-level deduplication. Accordingly, disposition module 106 may identify the deduplication fingerprint of the archived file to facilitate block-level deduplication. For example, disposition module 106 may identify one or more block-level deduplication fingerprints associated with the archived file (e.g., deduplication fingerprints associated with each block of the archived file) in order to correctly generate and/or maintain deduplication metadata for the archived file as represented by the placeholder file. Additionally or alternatively, disposition module 106 may identify the deduplication fingerprint of the archived file by identifying a unique identifier of the archived file that points to and/or may be used to locate block-level deduplication information for the archived file.

In some examples, disposition module 106 may determine the disposition of the archived file for deduplication by determining that the archived file is already deduplicated. In these examples, by having determined that the placeholder file represents the archived file, disposition module 106 may prevent retrieval of the archived file from archive storage and/or the overwriting of the placeholder file. For example, disposition module 106 may identify an access attempt performed on the placeholder file (e.g., a read attempt). Disposition module 106 may then fulfill the read attempt from a deduplicated data store instead of retrieving and/or allowing an archive system to retrieve the archived file. Additionally or alternatively, disposition module 106 may restore the archived file in place of the placeholder file by retrieving the data from the deduplicated data store instead of retrieving and/or allowing an archive system to restore the archived file from archive storage. In this manner, the systems and methods described herein may prevent costly data retrievals that may otherwise unnecessarily consume network and/or disk resources.

As explained above, by maintaining awareness of archived files and treating placeholder files as the archived files to which they refer for deduplication purposes, the systems and methods described herein may improve the efficiency of deduplication by preventing redundant processing of deduplicated files when deduplicated files are moved to and/or retrieved from archives. These systems and methods may thereby reduce the computing resources dedicated to deduplication and/or archiving and potentially leave more computing resources for use by primary applications.

Figure 5:
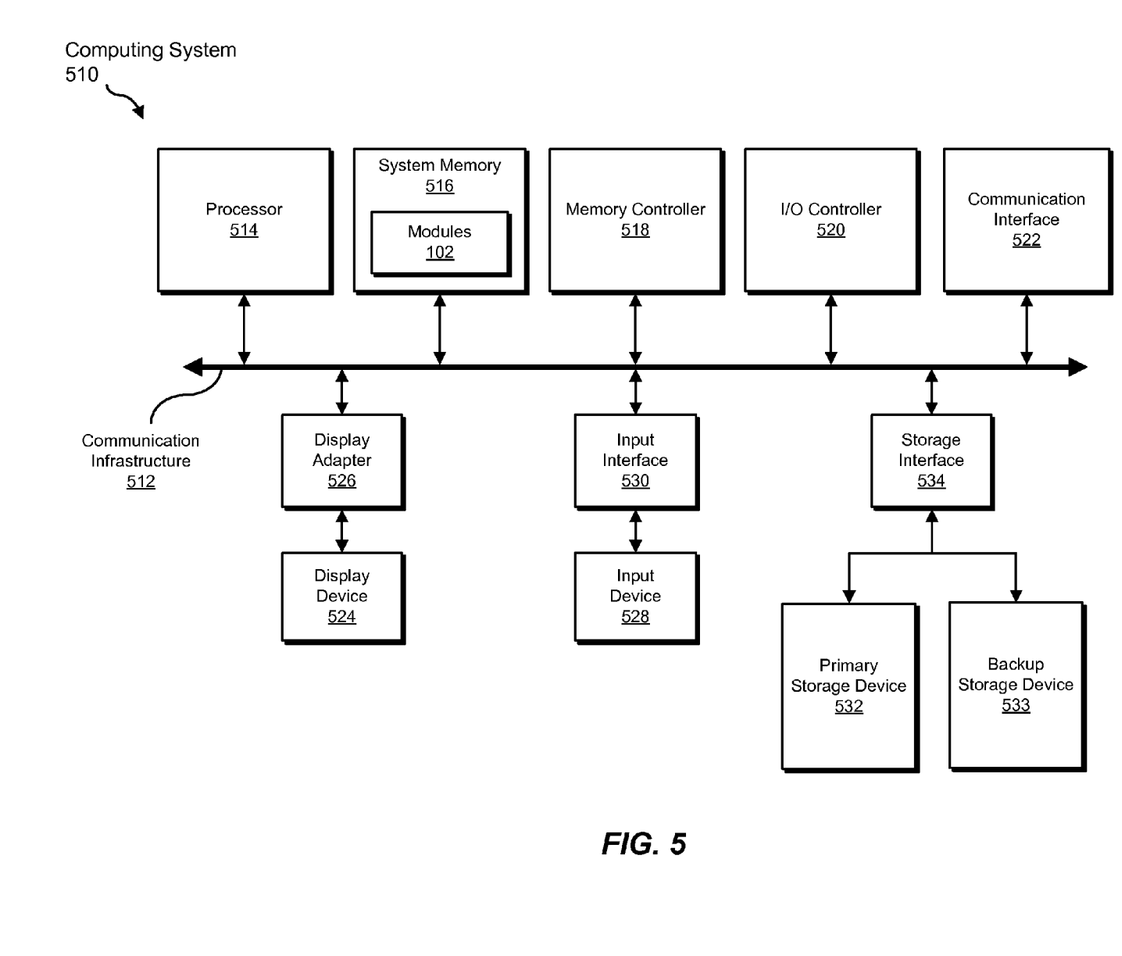
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, retrieving, generating, modifying, reading, deduplicating, maintaining, intercepting, providing, and/or transmitting steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
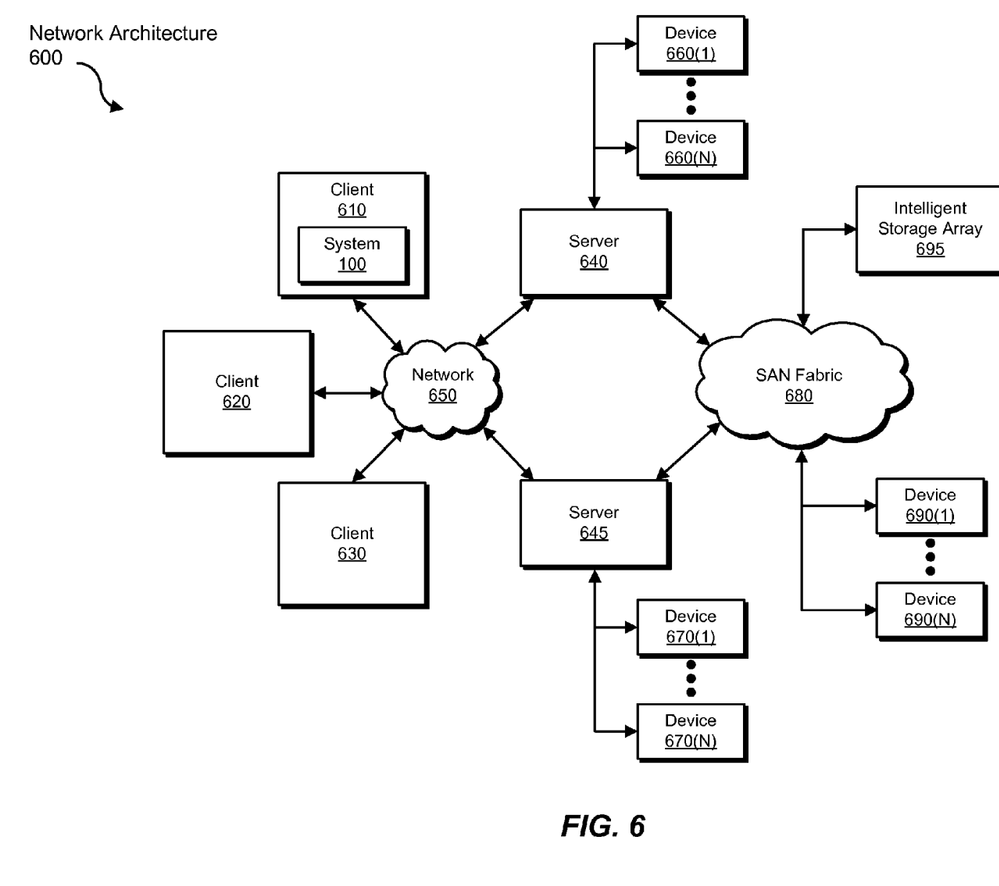
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, retrieving, generating, modifying, reading, deduplicating, maintaining, intercepting, providing, and/or transmitting steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for deduplicating archived data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a deduplication computing system into a system for efficiently deduplicating in the context of archived files.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for deduplicating archived data, at least a portion of the method being performed by a computing device comprising at least one processor, the method comprising:
    identifying a volume of data subject to deduplication, the volume of data comprising at least one archived file, the archived file being represented on the volume of data with a placeholder file and being stored on an alternate volume of data;
    determining a disposition of the archived file for deduplication by:
        determining that the archived file is represented by the placeholder file;
        in response to determining that the archived file is represented by the placeholder file, identifying a deduplication fingerprint of the archived file instead of a deduplication fingerprint of the placeholder file;
        intercepting an attempt by a deduplication engine to access the placeholder file;
        providing the deduplication fingerprint of the archived file to the deduplication engine.

2. The computer-implemented method of claim 1, wherein determining the disposition of the archived file for deduplication by identifying the deduplication fingerprint of the archived file comprises:
    based on the deduplication fingerprint of the archived file:
        identifying at least one additional instance of the archived file;
        deduplicating the archived file with the additional instance of the archived file.

3. The computer-implemented method of claim 1, wherein determining the disposition of the archived file for deduplication by identifying the deduplication fingerprint of the archived file comprises:
  based on the deduplication fingerprint of the archived file:
   identifying at least one additional instance of the archived file;
   maintaining a reference identifying the archived file as deduplicated with the additional instance of the archived file.

4. The computer-implemented method of claim 1, wherein identifying the deduplication fingerprint of the archived file comprises:
  retrieving the archived file;
  generating the deduplication fingerprint of the archived file.

5. The computer-implemented method of claim 4, further comprising modifying the placeholder file to include the generated deduplication fingerprint.

6. The computer-implemented method of claim 1, wherein identifying the deduplication fingerprint of the archived file comprises reading the deduplication fingerprint of the archived file from the placeholder file.

7. The computer-implemented method of claim 1, wherein determining the disposition of the archived file for deduplication further comprises:
  determining that the archived file is being restored in place of the placeholder file;
  transmitting a message to the deduplication engine that the archived file is unchanged.

8. A system for deduplicating archived data, the system comprising:
  an identification module programmed to identify a volume of data subject to deduplication, the volume of data comprising at least one archived file, the archived file being represented on the volume of data with a placeholder file and being stored on an alternate volume of data;
  a disposition module programmed to determine a disposition of the archived file for deduplication by:
   determining that the archived file is represented by the placeholder file;
   in response to determining that the archived file is represented by the placeholder file, identifying a deduplication fingerprint of the archived file instead of a deduplication fingerprint of the placeholder file;
   intercepting an attempt by a deduplication engine to access the placeholder file;
   providing the deduplication fingerprint of the archived file to the deduplication engine;
  at least one physical processor configured to execute the identification module and the disposition module.

9. The system of claim 8, wherein the disposition module is programmed to determine the disposition of the archived file for deduplication by, based on the deduplication fingerprint of the archived file:
  identifying at least one additional instance of the archived file;
  deduplicating the archived file with the additional instance of the archived file.

10. The system of claim 8, wherein the disposition module is programmed to determine the disposition of the archived file for deduplication by, based on the deduplication fingerprint of the archived file:
  identifying at least one additional instance of the archived file;
  maintaining a reference identifying the archived file as deduplicated with the additional instance of the archived file.

11. The system of claim 8, wherein the disposition module is programmed to identify the deduplication fingerprint of the archived file by:
  retrieving the archived file;
  generating the deduplication fingerprint of the archived file.

12. The system of claim 11, further comprising modifying the placeholder file to include the generated deduplication fingerprint.

13. The system of claim 8, wherein identifying the deduplication fingerprint of the archived file comprises reading the deduplication fingerprint of the archived file from the placeholder file.

14. The system of claim 8, wherein the disposition module is further programmed to determine the disposition of the archived file for deduplication by:
  determining that the archived file is being restored in place of the placeholder file;
  transmitting a message to the deduplication engine that the archived file is unchanged.

15. A non-transitory computer-readable-storage medium comprising one or more computer-executable instructions that, when executed by at least one processor of a computing device, cause the computing device to:
  identify a volume of data subject to deduplication, the volume of data comprising at least one archived file, the archived file being represented on the volume of data with a placeholder file and being stored on an alternate volume of data;
  determine a disposition of the archived file for deduplication by:
   determining that the archived file is represented by the placeholder file;
   in response to determining that the archived file is represented by the placeholder file, identifying a deduplication fingerprint of the archived file instead of a deduplication fingerprint of the placeholder file;
   intercepting an attempt by a deduplication engine to access the placeholder file;
   providing the deduplication fingerprint of the archived file to the deduplication engine.

16. The non-transitory computer-readable-storage medium of claim 15, wherein determining the disposition of the archived file for deduplication by identifying the deduplication fingerprint of the archived file comprises:
  based on the deduplication fingerprint of the archived file:
   identifying at least one additional instance of the archived file;
   deduplicating the archived file with the additional instance of the archived file.

17. The non-transitory computer-readable-storage medium of claim 15, wherein determining the disposition of the archived file for deduplication by identifying the deduplication fingerprint of the archived file comprises:
  based on the deduplication fingerprint of the archived file:
   identifying at least one additional instance of the archived file;
   maintaining a reference identifying the archived file as deduplicated with the additional instance of the archived file.

18. The non-transitory computer-readable-storage medium of claim 15, wherein identifying the deduplication fingerprint of the archived file comprises:
  retrieving the archived file;

generating the deduplication fingerprint of the archived file.

* * * * *